United States Patent [19]

Bavelloni

[11] Patent Number: 5,184,430
[45] Date of Patent: Feb. 9, 1993

[54] MACHINE FOR MACHINING EDGES, PARTICULARLY OF GLASS PLATES

[75] Inventor: Franco Bavelloni, Appiano Gentile, Italy

[73] Assignee: Z. Bavelloni S.p.A., Bregnano, Italy

[21] Appl. No.: 776,036

[22] Filed: Oct. 15, 1991

[30] Foreign Application Priority Data

Oct. 22, 1990 [IT] Italy ................... 21815 A/90

[51] Int. Cl.⁵ ............................................. B24B 47/20
[52] U.S. Cl. .................................. 51/215 E; 51/110
[58] Field of Search .......... 51/240 GB, 216 R, 283 R, 51/283 E, 215 E, 110; 198/626.5

[56] References Cited

U.S. PATENT DOCUMENTS

| 4,079,551 | 3/1978 | Bando | 51/110 |
| 4,493,167 | 1/1985 | Bovone | 51/110 |
| 4,537,301 | 8/1985 | Bavelloni . | |
| 4,660,327 | 4/1987 | Bando . | |
| 4,843,764 | 7/1989 | Bando | 51/215 E |
| 4,908,992 | 3/1990 | Cevrero et al. . | |

Primary Examiner—Bruce M. Kisliuk
Assistant Examiner—Bryan Reichenbach
Attorney, Agent, or Firm—Guido Modiano; Albert Josif

[57] ABSTRACT

The machine for machining edges, particularly of glass plates, includes, on a supporting structure, mutually opposite conveyors which extend continuously and are suitable for moving the plates to be machined at machining heads. At least one of the conveyors has a plurality of adjacent sliding blocks each of which includes an elongated supporting body on which a covering is provided which has blocks for gripping the plates being machined. The elongated supporting body has, inside it, a T-shaped seat for slidingly retaining and guiding a rod-like element to which a pad is connected; the pad can be arranged at a presettable distance from the blocks, which have a fixed vertical placement with respect to the machining surface.

10 Claims, 3 Drawing Sheets

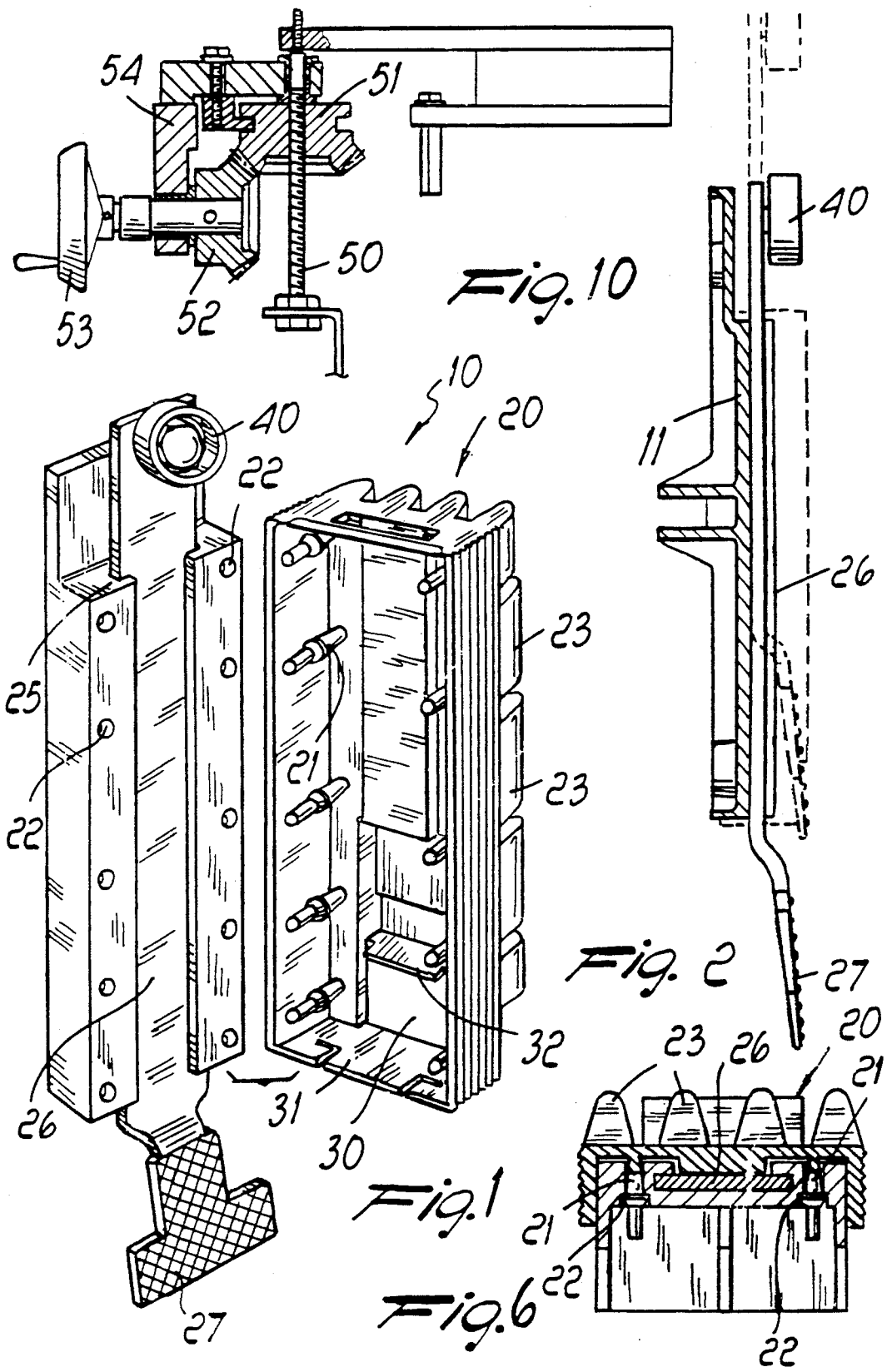

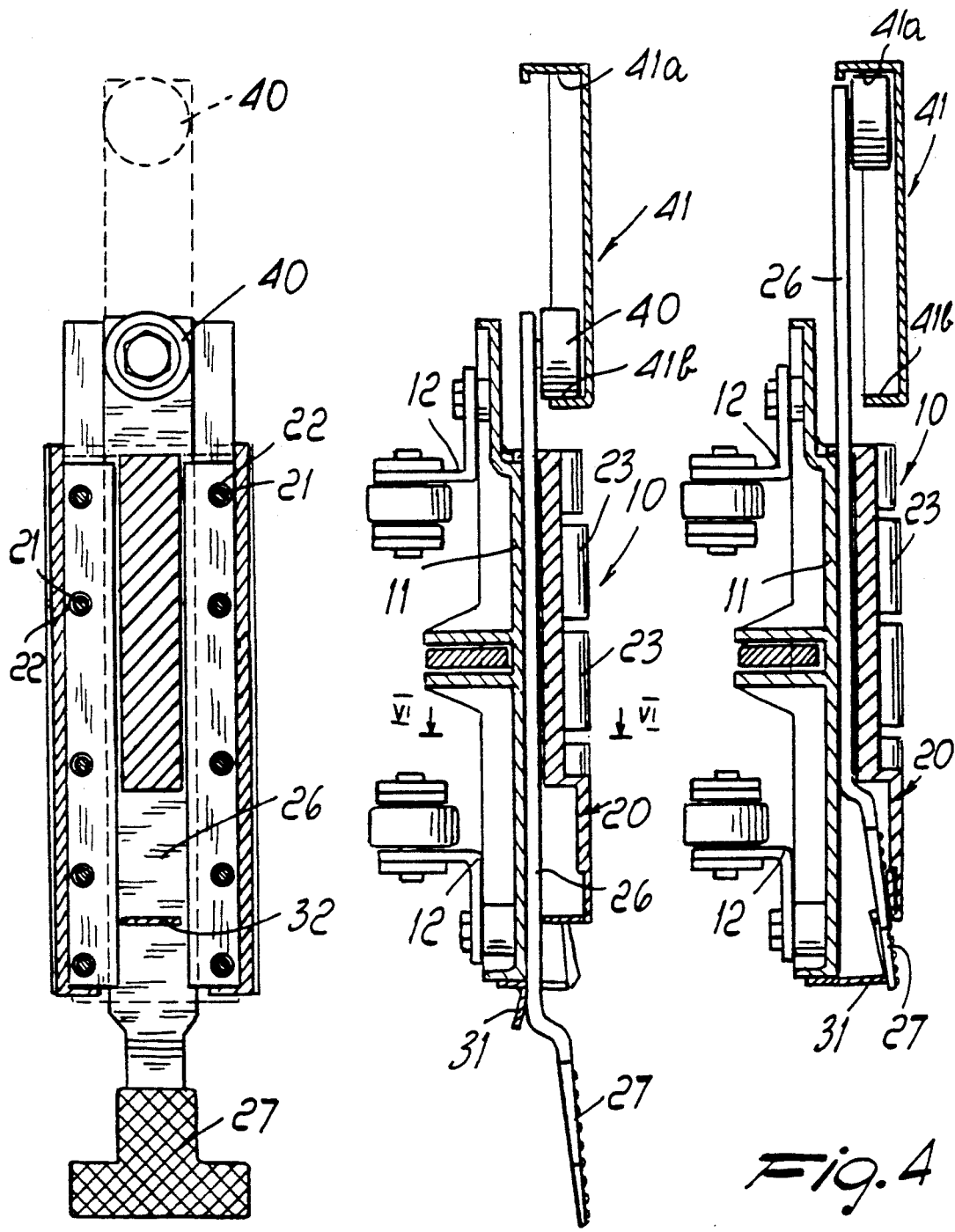

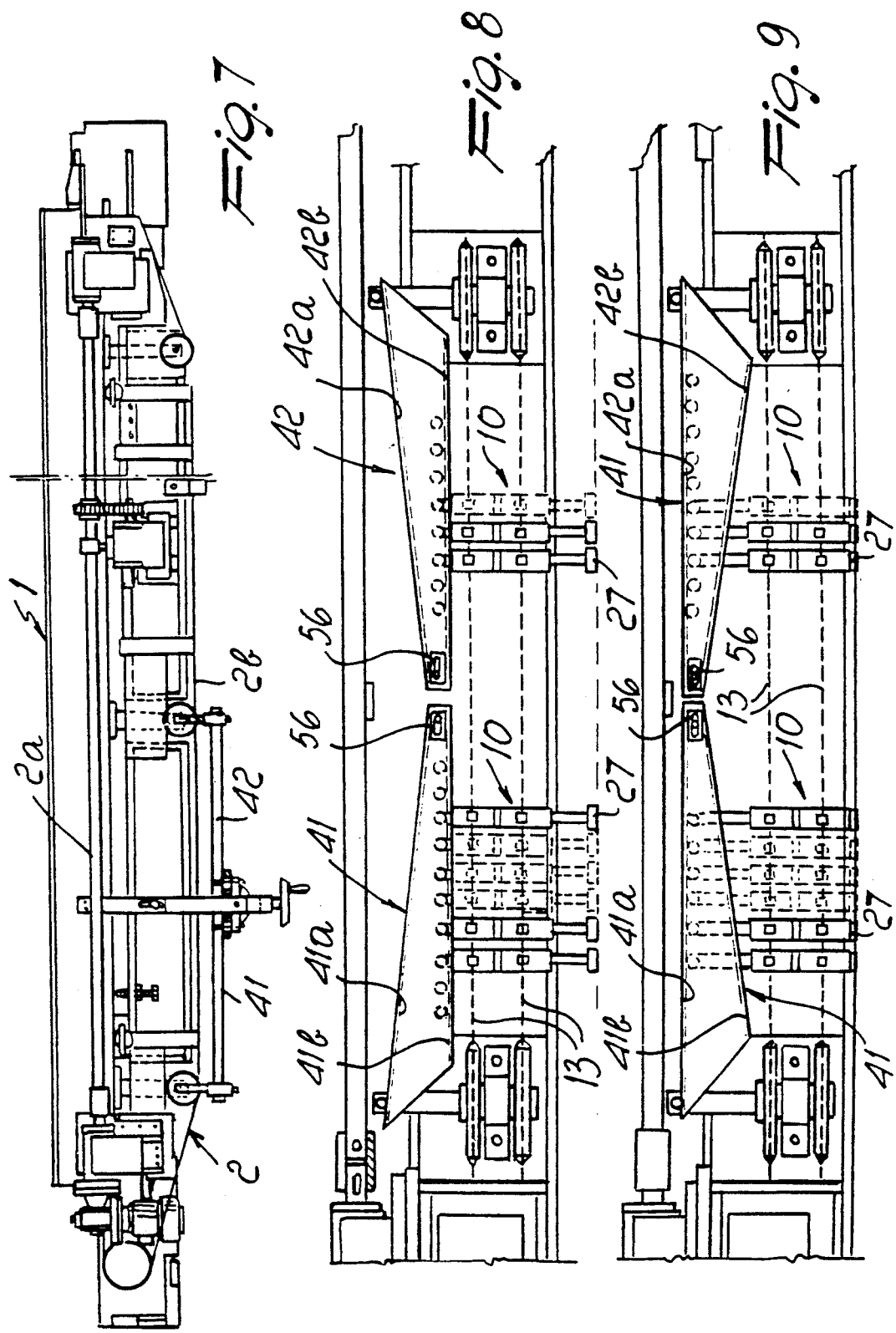

MACHINE FOR MACHINING EDGES, PARTICULARLY OF GLASS PLATES

BACKGROUND OF THE INVENTION

The present invention relates to a machine for machining edges, particularly of glass plates.

As is known, machines for machining the edges of glass plates, such as for example chamfering machines, generally have, on a supporting structure, a pair of opposite conveyors which extend continuously and retain the plate, arranged edgeways, between them; said plate must be moved to be machined on machining heads which generally have grinders which protrude upward from the machining table.

In order to allow the accommodation of the machining heads, the sliding blocks which retain the glass plates and are provided on the continuously extending conveyors must therefore remain at a certain distance from the machining surface, since they would otherwise interfere with the machining heads.

It is also known that in some cases it is necessary to machine the edges of small glass plates.

Accordingly, in order to try to solve this problem, solutions have already been provided which in practice entail a sliding block which can move with respect to the conveyor along a direction which is substantially perpendicular to said conveyor advancement direction, so that it is possible to retain even small plates.

However, this solution creates considerable disadvantages, since the guides for the translatory motion of the sliding blocks, which are moved monolithically, are unavoidably subjected to very heavy wear, being exposed to the machining dust and waste, which is generally composed of the abrasive compound which constitutes the grinder and of minute glass particles.

In these conditions, the machine is thus subjected to very heavy wear, which is increased by the fact that the sliding blocks are moved continuously, since with the structure according to the known art the sliding block is necessarily arranged in its lowered position along the portion during which it retains the plate but is lifted in the opposite portions, so that the movement is continuous and wear is very heavy.

Furthermore, cam systems are used in order to perform the translatory motion of the sliding block; such systems do not allow to move the conveyors in the opposite direction, as is instead required for maintenance or for special events, since the rollers which must follow the cams would remain in raised position during the reversal step and would consequently interfere with the cams, creating unavoidable breakages.

SUMMARY OF THE INVENTION

The aim of the invention is indeed to eliminate the above described disadvantages by providing a machine for machining edges, particularly of glass plates, wherein the sliding block is always kept at a constant height with respect to the machining surface and only a small and very thin grip part which can slide with respect to the guides which are sealingly protected with respect to the outside, is moved.

Within the scope of the above aim, a particular object of the invention is also to allow even very sharp chamfering angles with no interference of the machining heads, since the part which retains the plates is small and has an extremely reduced thickness, so that interference is always avoided.

Another object of the present invention is to provide a machine for machining the edges of glass plates wherein it is possible to guide the translatory motion of the part which is arranged so as to extend the sliding block even during the steps of the reversal of the motion of the conveyor, without having problems of damage or interference.

Not least object of the present invention is to provide a machine for machining edges, particularly of glass plates, which by virtue of its peculiar characteristics of execution is capable of giving the greatest assurances of reliability and safety in use.

This aim, these objects, and other aims and objects which will become apparent hereinafter, are achieved by a machine for machining edges, particularly of glass plates, according to the present invention, as defined in the appended claims.

BRIEF DESCRIPTION OF THE DRAWINGS

Further characteristics and advantages will become apparent from the description of a preferred but not exclusive embodiment of a machine for machining edges, particularly of glass plates, according to the present invention, illustrated only by way of non-limitative example in the accompanying drawings, wherein:

FIG. 1 is an exploded schematic perspective view of a sliding block according to the invention;

FIG. 2 is a sectional view of the connection between the supporting body and the rod-like element;

FIGS. 3 and 4 are longitudinal sectional views of the sliding block, with the pad respectively in the fully lowered position and in the fully raised position;

FIG. 5 is a sectional view of the sliding block, taken along a median plane, illustrating the arrangement of the covering with respect to the supporting body;

FIG. 6 is a sectional view, taken along the line VI—VI of FIG. 3;

FIG. 7 is a schematic plan view of the machine according to the invention, illustrating one of the conveyors;

FIGS. 8 and 9 are detail side views of the machine of FIG. 7 showing the means for actuating the translatory motion of the rod-like element in two different operating positions;

FIG. 10 is a schematic view of the means for positioning the translatory means of the rod-like element.

DESCRIPTION OF THE PREFERRED EMBODIMENTS

With reference to the above figures, the machine for machining edges, particularly of glass plates, comprises a supporting structure, generally indicated by the reference numeral 1 in FIG. 7, on which two conveyors 2 are provided; said conveyors are arranged mutually opposite so as to retain, between them, a glass plate arranged edgeways.

The conveyors extend continuously, and each has an arm 2a which is arranged adjacent so as to engage the plates.

At least one of the conveyors 2, as seen in FIGS. 7-9, is constituted by a plurality of sliding blocks, generally indicated by the reference numeral 10, each of which comprises a supporting body 11 which is provided, in a rearward position, with couplings, generally indicated by 12, for the connection of the various adjacent sliding blocks so as to define in practice a pair of chains 13 which extends continuously.

It should be noted that since the FIGS. 7-9 show only one conveyor belt, another supporting means for the glass plate is arranged mutually opposite to the plate engaging arm 2a as seen in FIG. 7, so that as mentioned previously such arm 2a and supporting means engage the glass plate which is arranged edgeways, that is vertically into the plane of FIG. 7 (FIG. 7 being a plan view). The oppositely arranged supporting means can be completely similar to the conveyor belt as seen in FIGS. 7-9, or alternatively it can be a conventional roller belt or even a fixed support. The grinding tool for machining the edge of the glass plate is fixed in a position below the conveyor belt of FIG. 7 in a conventional manner, in order to thereby machine a lower edge of such plate.

A covering, indicated by 20, is provided on the supporting body 11, is advantageously made of rubber or similar materials and is connected by means of lugs 21 which are inserted in holes 22 defined o the supporting body.

The covering 20 defines, on its active face, a plurality of blocks 23 which engage the plate by contact.

An important feature of the invention is constituted by the fact that the supporting body 11, in the region which is contained by the covering 20, defines a T-shaped seat 25 which constitutes means for the retention and sliding guiding of a rod-like element 26 which has connected to its own lower end a pad 27; said pad is possibly covered with soft material, has a reduced thickness, and its active face is substantially flush with the ends of the plurality of blocks 23.

The covering 20 has the peculiar function of constituting a sealing element which prevents the infiltration of abrasive material in the T-shaped seat, consequently avoiding wear.

For this purpose, the covering 20 is provided, in a downward position, with an opening 30 from which the pad 27 protrudes. Said opening 30 is delimited downward by an elastic lip 31 which rests above the element 26 so as to constitute a seal, and is similarly provided, on the opposite edge, with an elastic flap 32 which prevents the passage of abrasive material or dirt toward the region affected by the guides.

With the described arrangement, the sliding block thus always maintains its working level, whereas it is the pad 27 that is vertically adjustable with respect to the working surface, so as to be able to engage small glass plates.

This fact is very important, since the regions subjected to mutual sliding, i.e. the rod-like element 26 which slides in the guide 25, are not subjected to particular wear.

To the above one should furthermore add that a roller 40 is provided at the upper end of the element 26 and has the function of engaging means for vertically positioning the pads.

Said means, as more clearly illustrated in FIGS. 7 to 9, are constituted by a pair of box-like open-ended elements, indicated by 41 and 42, which are arranged one after the other and respectively define a lower edge 41a, 42a and an upper edge 41b and 42b, which mutually converge in the central region, i.e., if the two box-like elements are seen one after the other, they respectively have a converging arrangement and a diverging arrangement. The open-ended box-like elements are arranged so that the rollers 40 of the elements 26 pass through such box-like elements when the blocks 10 are set in motion.

Said box-like elements 41 and 42 are articulated at their outward-ends the supporting structure, so as to allow the vertical movement of the central ends, with the consequent shift of the position of the lower and upper tracks defined thereby.

More in detail, the positioning level of the pads is determined by the vertical positioning of the central ends of the box-like elements, independently of the level assumed by the pads when the related rollers enter the region delimited by the box-like elements.

In fact, if the rollers are arranged higher than the central ends, they engage the upper tracks and are lowered to the required level, whereas if the rollers are arranged lower than the central ends, they engage the lower track, consequently raising the pads. Thus it is seen that in effect the tracks of the box-like elements 41 and 42 function as cams upon which the rollers 40 follow during movement of the sliding blocks 10 to thereby determine the vertical position of the rod-like elements 26 and corresponding pads 27. The pads 27 are advantageously lowered, when needed, in order to engage a glass plate which does not have a vertical extension large enough to been gaged by the blocks 23.

If the rollers enter the box-like elements already at the correct height, the rod-like elements in practice undergo no translatory motions.

The use of two box-like elements arranged after one another allows to reverse the sliding motion of the conveyors without thereby causing problems.

In order to vary the height of the central ends of the box-like elements there is a unit for adjusting the means for vertically positioning the pads, illustrated in figure 10, which in a simplified form is constituted by a fixed vertical threaded rod 50 on which a first bevel gear 51 is screwed; the first head gear meshes with a second bevel gear 52 which is connected to a handwheel 53, which is rotatably supported by a movable carriage 54, which is connected to the first bevel gear 51 as seen in FIG. 10, and which, by means of pins or the like, connects to slots 56 defined on the ends of the box-like elements.

The translatory motion of the carriage and of the central ends of the box-like elements connected thereto is consequently caused by acting on the handwheel.

From what has been described above it can thus be seen that the invention achieves the intended aim and objects, and in particular the fact is stressed that the solution consisting in keeping at a fixed height the sliding blocks which engage the glass plates, moving only a pad which is connected to a plate-like element which can slide in guides which are arranged inside the sliding blocks and are protected outward, allows to eliminate the severe wear problems which are observed in these machines, also taking into account the fact that the area where they operate is subjected to the diffusion of abrasive material.

The provision of the means for positioning the pads by virtue of a pair of box-like elements arranged after one another and having tracks which converge toward their central ends allows to reverse the movement of the traction elements, as cannot be obtained on known machines.

The invention thus conceived is susceptible to numerous modifications and variations, all of which are within the scope of the invention concept.

All the details may furthermore be replaced with other technically equivalent elements.

I claim:

1. A machine for machining edge of a plate, particularly of a glass plate, comprising a conveyor means for supporting and conveying the plate, said conveyor means comprising at least one chain element formed at least in part by a plurality of mutually interconnected sliding blocks, said conveyor means further comprising a supporting means arranged facing said chain element for supporting said plates between said chain element and said supporting means, each one of said sliding blocks of said chain element comprising an elongated supporting body upon which a covering is provided, said covering being provided on an exterior surface thereof with gripping blocks for gripping the plate to be machined, said each one of said sliding blocks comprising internally thereof means for slidingly retaining and guiding a rod element to which a pad for engaging the plate is connected at a first end thereof, said pad being arrangeable at a presettable distance from said gripping blocks depending upon a positioning of said rod element.

2. A machine according to claim 1, wherein said covering is made of elastically yielding material and is provided with lugs which engage in corresponding holes provided on said elongated supporting body thereby for connecting said covering to said elongated supporting body.

3. A machine according to claim 1, wherein said means for sliding retaining and guiding said rod element comprise a longitudinal seat which is defined in said elongated supporting body and which has a T-shaped transverse cross-section, said rod element being a flattened bar having a rectangular cross-section shape.

4. A machine according to claim 1, wherein said covering is provided at one end thereof with an opening for an outward passage of said first end of said rod element which is provided with said pad, said opening being delimited by a pair of elastic flaps for providing a closed seal about said first end of said rod element and said pad.

5. A machine according to claim 1, wherein said rod element is provided, at a second end thereof which is opposite to said first end and which extends outside of said elongated body and said cover, with a roller, said machine further comprising cam means with which said roller is engageable during a movement of said chain element for slidably moving said rod element and thereby for positioning said pad.

6. A machine according to claim 5, wherein said cam means comprise a first open-ended box element and a second open-ended box element which are arranged one after the other with respect to the direction of advancement of said chain element, and into which said roller enters upon the movement of said chain element, said box elements having central ends which are arranged mutually adjacent and opposite ends which are pivoted to a fixed supporting structure of the machine, thereby said central ends being able to assume different positions with respect to a path along which said roller travels during the movement of said chain element.

7. A machine according to claim 6, wherein said path along which said roller travels is substantially horizontal, said central ends being able to move vertically with respect to said horizontal path, said box elements each having an upper guiding track arranged above said path and a lower guiding track arranged below said path, and wherein said upper and lower guiding tracks together of said box elements converge toward said central ends.

8. A machine according to claim 7, further comprising means for vertically moving said central ends of said box elements with respect to said path along which said roller travels.

9. A machine according to claim 8, wherein said means for vertically moving said central ends of said box elements comprise a fixed threaded vertical rod, a first bevel gear screwed on said vertical rod, a second bevel gear which meshes with said first bevel gear, a handwheel for rotating said second bevel gear, and a carriage which rotatably supports said handwheel and which is connected to said first bevel gear so as to allow the rotation thereof and so as to move vertically therewith, said carriage being connected to said central ends of said box-elements.

10. A machine according to claim 7, wherein said roller is engageable with said lower and upper tracks of said box elements in order to vary the vertical position of said pad.

* * * * *